US011783465B2

(12) United States Patent
Dominguez et al.

(10) Patent No.: US 11,783,465 B2
(45) Date of Patent: Oct. 10, 2023

(54) FLYING DRONE FOR INSPECTING SURFACES, AND METHOD FOR INSPECTING SURFACES BY SUCH A FLYING DRONE

(71) Applicant: Airbus Operations (S.A.S.), Toulouse (FR)

(72) Inventors: Nicolas Dominguez, Toulouse (FR); François Lefebvre Albaret, Toulouse (FR); Florent Montet, Toulouse (FR); Jérome Fayolet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/535,052

(22) Filed: Nov. 24, 2021

(65) Prior Publication Data

US 2022/0172344 A1    Jun. 2, 2022

(30) Foreign Application Priority Data

Nov. 27, 2020    (FR) ...................................... 2012246

(51) Int. Cl.
*G06T 7/00*    (2017.01)
*G06T 7/514*    (2017.01)
(Continued)

(52) U.S. Cl.
CPC .......... *G06T 7/0004* (2013.01); *B64C 39/024* (2013.01); *B64D 47/02* (2013.01);
(Continued)

(58) Field of Classification Search
CPC ......... G06T 7/0004; G06T 7/40; G06T 7/514; G06T 7/55; G06T 7/70;
(Continued)

(56) References Cited

U.S. PATENT DOCUMENTS 9,830,411 B2    11/2017  Gnecco et al.
2018/0035606 A1*  2/2018  Burdoucci ............. A01G 3/085
(Continued)

FOREIGN PATENT DOCUMENTS

| DE | 10 2017 102338 A1 | 8/2018 |
| FR | 3 038 109 A1 | 12/2016 |
| WO | WO 2019/183955 A1 | 10/2019 |

OTHER PUBLICATIONS

French Search Report for Application No. 2012246 dated Jul. 28, 2021.
(Continued)

*Primary Examiner* — Nasim N Nirjhar
(74) *Attorney, Agent, or Firm* — KDW Firm PLLC

(57) ABSTRACT

A flying drone for inspecting surfaces able to reflect light has a lighting device formed of two light sources each having a shape that is elongate in a longitudinal direction of each of the light sources, two first image acquisition devices, and a second image acquisition device between the two first image acquisition devices. The two light sources are respectively between the second image acquisition device and each of the first image acquisition devices. The flying drone allows effective detection of dents in surfaces by analyzing specular reflections, by the lighting device and of the first image acquisition devices, and effective detection of superficial defects on surfaces by the second image acquisition device, with the lighting device switched off.

15 Claims, 12 Drawing Sheets

(51) Int. Cl.
*G06T 7/55* (2017.01)
*G06T 7/70* (2017.01)
*B64C 39/02* (2023.01)
*B64D 47/02* (2006.01)
*B64D 47/08* (2006.01)
*F21V 21/30* (2006.01)
*G06T 7/40* (2017.01)
*H04N 23/57* (2023.01)
*H04N 23/90* (2023.01)
*H04N 23/695* (2023.01)
*B64U 10/13* (2023.01)
*B64U 30/20* (2023.01)
*B64U 101/30* (2023.01)
*H04N 23/56* (2023.01)

(52) U.S. Cl.
CPC .............. *B64D 47/08* (2013.01); *F21V 21/30* (2013.01); *G06T 7/40* (2013.01); *G06T 7/514* (2017.01); *G06T 7/55* (2017.01); *G06T 7/70* (2017.01); *H04N 23/56* (2023.01); *H04N 23/57* (2023.01); *H04N 23/695* (2023.01); *H04N 23/90* (2023.01); *B64U 10/13* (2023.01); *B64U 30/20* (2023.01); *B64U 2101/30* (2023.01); *G06T 2207/10032* (2013.01); *G06T 2207/30108* (2013.01)

(58) Field of Classification Search
CPC . G06T 2207/10032; G06T 2207/30108; B64C 39/024; B64C 2201/027; B64C 2201/108; B64C 2201/127; B64C 2201/123; B64D 47/02; B64D 47/08; B64D 2203/00; F21V 21/30; H04N 5/2256; H04N 5/2257; H04N 5/23299; H04N 5/247; G01N 2201/0214; G01N 21/55; G01N 21/952; G01N 21/8806; G01N 21/8851; G01N 2021/8845; B64F 5/60
See application file for complete search history.

(56) References Cited

U.S. PATENT DOCUMENTS

| | | | |
|---|---|---|---|
| 2019/0002093 A1 | 1/2019 | Muramatsu et al. | |
| 2019/0128772 A1 | 5/2019 | Heinrich et al. | |
| 2019/0287237 A1 | 9/2019 | de Bonfim Gripp et al. | |
| 2019/0322362 A1* | 10/2019 | Santangelo | B64C 1/30 |
| 2020/0340802 A1* | 10/2020 | Tyson | G01M 5/0091 |
| 2021/0061463 A1* | 3/2021 | Briod | B64D 27/24 |
| 2022/0171410 A1* | 6/2022 | Amsili | B64D 47/08 |

OTHER PUBLICATIONS

Cook, Lawrence. "Visual Inspection Reliability for Composite Aircraft Structure." http://dspace.lib.cranfield.ac.uk/handle/1826/6834. Cranfield University, 2009.

\* cited by examiner

FLYING DRONE FOR INSPECTING SURFACES, AND METHOD FOR INSPECTING SURFACES BY SUCH A FLYING DRONE

CROSS-REFERENCE TO RELATED APPLICATION

This application claims priority to French patent application number 20 12246 filed on Nov. 27, 2020, the entire disclosure of which is incorporated by reference herein.

TECHNICAL FIELD

The disclosure herein relates to a flying drone for inspecting surfaces and to a method for inspecting a surface able to reflect light, such as the external surface (or skin) of an aircraft, notably so as to detect dents and superficial defects in such a surface. Such dents may be caused notably by a falling object or by bird strike, whereas such superficial defects may be the result of scratches, fine cracks, etc.

BACKGROUND

Dents and superficial defects in the external surface of an aircraft have conventionally been detected by visual inspection. In that case, the position of the dents and superficial defects have been identified manually using measuring tools such as tape measures, with reference to visible structural elements such as frames, stringers or ribs that form the internal structure of the fuselage or of the wing.

Such an operation involves the intervention of numerous operators and is lengthy to perform, particularly in instances in which scaffolding has to be erected in order to access an upper part of the aircraft.

The use of drones equipped with telemetry devices for detecting and measuring dents in the external surface of an aircraft has also been proposed, in document FR3038109B1 (and its equivalent U.S. Pat. No. 9,830,411B2).

This method allows a considerable time-saving and a considerable cost reduction but requires precise a priori knowledge of the ideal (i.e. defect-free) geometry of the surface that is to be analyzed, and is not always able to achieve sufficient measurement precision.

SUMMARY

The subject-matter of the disclosure herein is a flying drone and a method which are suitable for inspecting surfaces, notably surfaces of large dimensions (for example several hundred square meters), which are efficient and quick to implement and which are able, at least in part, to overcome the above-mentioned disadvantages.

To this end, the disclosure herein proposes a flying drone for inspecting surfaces, comprising:
 a chassis bearing one or more rotor(s);
 a lighting device formed of two light sources each having a shape that is elongate in a longitudinal direction of each of the light sources, and
 an image acquisition assembly, comprising:
  two first image acquisition devices;
  a second image acquisition device positioned between the two first image acquisition devices; and
 wherein the two light sources are positioned respectively between the second image acquisition device and each of the first image acquisition devices.

The way in which a surface is illuminated greatly influences the detectability of defects in such a surface. Thus, diffuse lighting is better suited to revealing superficial defects such as variations in the color of the surface, scratches, runs, or corrosion. In such instances, there is a risk that an unwanted specular reflection may be confused with a superficial defect. For example, the reflection of a line might be confused with a scratch. By contrast, the specular reflection of a known pattern off a sufficiently glossy surface may make it possible to identify three-dimensional defects such as dents or bumps.

Thus, the flying drone according to the disclosure herein is of particular benefit in that it allows both effective detection of dents in surfaces by analyzing specular reflections, by the lighting device and of the two first image acquisition devices, and effective detection of superficial defects in the surfaces, by the second image acquisition device, with the lighting device switched off, as will become more clearly apparent in what follows.

The respective masses of these different devices and the contributions they make to the moment of inertia of the drone may further be optimized according to the needs specific to the two aforementioned detection types, so as to limit, as best possible, the overall mass of the flying drone and the overall moment of inertia thereof.

As a preference, at least when the flying drone is in one particular state, the two light sources, the two first image acquisition devices and the second image acquisition device are aligned along an axis of alignment corresponding to the longitudinal direction of each of the light sources.

In one preferred embodiment of the disclosure herein, the flying drone comprises two supports of elongate shape borne by the chassis and extending parallel to the axis of alignment, the two first image acquisition devices are rigidly fixed to the two supports respectively, and the two light sources are rigidly fixed to the two supports respectively.

As a preference, the flying drone comprises a first drive device configured to make each of the two first image acquisition devices and/or each of the two light sources rotate about a first axis, where applicable parallel to the axis of alignment, in an angular amplitude range at least equal to 30 degrees.

The first axis is advantageously offset from the rotors of the flying drone so that these rotors remain outside a field of view of each of the two first image acquisition devices whatever the orientation of the latter in a range of at least 180 degrees about the first axis.

For this purpose, the first axis is, for example, offset from the rotors of the flying drone in a direction orthogonal to a mean direction of respective axes of the rotors.

Furthermore, the two light sources are advantageously configured to emit green light.

As a preference, the flying drone comprises a gyrostabilizer by which the second image acquisition device is fixed to the chassis.

As a preference, the flying drone comprises a second drive device configured to make the second image acquisition device rotate about a second axis, where applicable parallel to the axis of alignment, in an angular amplitude range at least equal to 30 degrees.

The second axis is advantageously offset from the rotors of the flying drone so that these rotors remain outside a field of view of the second image acquisition device whatever the orientation of the latter in a range of at least 180 degrees about the second axis.

For this purpose, the second axis is, for example, offset from the rotors of the flying drone in a direction orthogonal to the mean direction of the respective axes of the rotors.

The disclosure herein also relates to a method for inspecting a surface able to reflect light, comprising at least the following steps:

A) Obtaining the use of a flying drone of the type described hereinabove;

B) Moving the flying drone past the surface along a trajectory, alternating phases of pseudo-hovering flight and transient phases during which the speed of travel of the flying drone is greater than the speed, if any, of the flying drone in the phases of pseudo-hovering flight, so as to carry out the following steps:

B1) During the transient phases, with the light sources illuminated, acquiring at least a series of images of portions of the surface by each of the first image acquisition devices so that, for each image in each series, the lighting device is illuminating the corresponding portion of the surface;

B2) During the phases of pseudo-hovering flight, with the light sources switched off, acquiring other images of portions of the surface by the second image acquisition device, the other images acquired in step B2 having a resolution greater than that of the images acquired in step B1.

In general, the method according to the disclosure herein allows a surface to be inspected in a particularly effective manner using the flying drone of the type described hereinabove. In particular, the images acquired in step B1 allow the detection of dents in the surface by analyzing the specular reflection of the lighting device, a task for which moderate resolution may suffice, whereas the other images acquired in step B2, because the lighting device is switched off and their resolution is better, are optimized for detecting superficial defects.

Detecting dents in the surface by analyzing the specular reflection of the lighting device notably allows surfaces of very large dimensions, for example several hundred square meters, to be analyzed in a particularly quick, effective and reliable way, without requiring precise prior knowledge of the shape of these surfaces.

In some embodiments of the disclosure herein, the method further comprises a step C1 consisting in or comprising operating a data processing device to analyze the shape of a specular reflection of the lighting device in all or part of the images of each series of images that is acquired in step B1, so as to estimate the position of any dents in the surface.

In some embodiments of the disclosure herein, step C1 comprises, for each series of images that is acquired in step B1, the following steps:

C1-I) For each image of the series of images, operating the data processing device so as to:

c1) Identify the specular reflection of the lighting device in the image;

c2) From the specular reflection identified in the preceding sub-step, estimate the median position, orthogonally to the longitudinal direction of the two light sources, of an ideal specular reflection of the lighting device in the image, corresponding to the median position of such a specular reflection in the absence of any dent in the surface;

c3) Determine a distance between the flying drone and the surface;

c4) Determine the position, on the surface, of each point of an origin of the specular reflection of the lighting device in the image;

c5) Estimate a local gradient of the surface at each point of the origin of the specular reflection, at least from an estimate of any distance there might be between each point of the specular reflection of the light source in the image and the estimated median position of the ideal specular reflection;

C1-II) From all of the estimated local gradients obtained as the outcome of step C1-I for at least one region of the surface, operating the data processing device so as to estimate the position of any dents there might be in the surface.

In some embodiments of the disclosure herein, the method further comprises a step C2 that consists in or comprises operating a (or the) data processing device so as to analyze the other images acquired in step B2, so as to detect any superficial defects there might be in the surface.

Where it is desirable to do so, the method according to the disclosure herein allows all or part of analysis step C to be automated. When the ideal geometry of the surface that is to be inspected is known, at least roughly, the control of the movement of the flying drone can be performed entirely or partially in a programmed manner, so that it is also possible for step B of the method to be automated.

The disclosure herein also relates to a system for inspecting a surface able to reflect light, comprising a flying drone of the type described hereinabove, and a data processing device configured to implement at least one of the steps C1 and C2 of the method.

BRIEF DESCRIPTION OF THE DRAWINGS

The disclosure herein will be better understood, and further details, advantages and features thereof will become apparent from reading the following description given by way of non-limiting example and with reference to the attached drawings in which.

Figure 1:
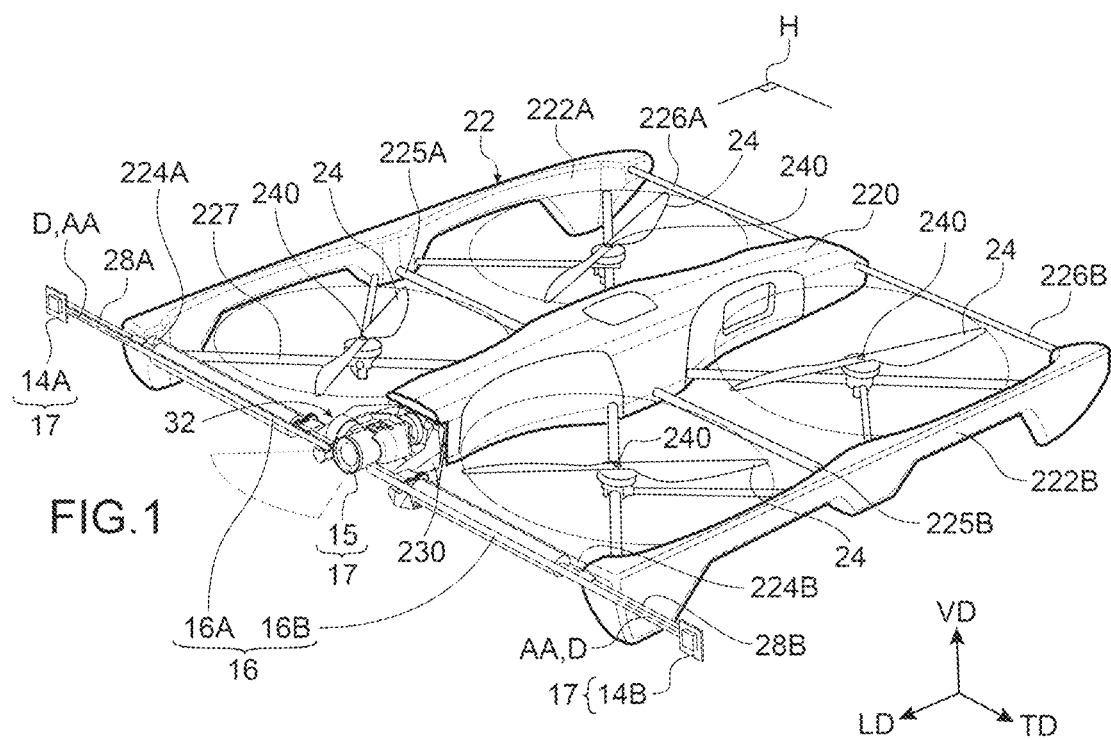
FIG. 1 is a schematic perspective view of a flying drone for inspecting surfaces able to reflect light.

In all of these figures, identical references may denote elements that are identical or analogous.

DETAILED DESCRIPTION

A flying drone 12 according to one preferred embodiment of the disclosure herein will be described first of all, with reference to FIGS. 1 through 3.

In general, flying drone 12 comprises a chassis 22 bearing one or more rotor(s) 24; a lighting device 16 formed of two light sources 16A, 16B each having a shape that is elongate, preferably longilinear, defining a longitudinal direction D of each of the light sources 16A, 168; and an image acquisition assembly 17.

The image acquisition assembly 17 comprises two first image acquisition devices 14A, 14B, and a second image acquisition device 15 positioned between the two first image acquisition devices 14A, 14B.

In addition, one, 16A, of the two light sources is positioned between the second image acquisition device 15 and one, 14A, of the first image acquisition devices, whereas the other light source 16B is positioned between the second image acquisition device 15 and the other first image acquisition device 14B.

In the embodiment described, the lighting device 16 and the image acquisition assembly 17 are positioned in such a way that, at least when the flying drone 12 is in one particular state (particularly for a given relative orientation of the image acquisition devices, such as the orientation illustrated in the figures), the two light sources 16A, 16B, the two first image acquisition devices 14A, 14B and the second image acquisition device 15 are aligned or substantially aligned along an axis of alignment AA corresponding to the longitudinal direction D of the light sources 16A, 16B which, in such a case, is the same for each one of the light sources 16A, 16B and thus defines a longitudinal direction of the lighting device 16.

In particular, having the two light sources 16A and 16B aligned or nearly aligned means that the overall specular reflection of the lighting device 16 off a planar surface, and seen by each of the image acquisition devices, has a substantially rectilinear elongate shape. Of course, the space needed for the second image acquisition device 15 between the two light sources 16A, 16B results in a discontinuity in the aforementioned specular reflection, which can easily be taken into consideration in implementing the dent detection method that will be described in what follows.

The chassis 22 of the flying drone is formed for example of three longitudinal bodies, namely a central body 220 and two lateral bodies 222A and 222B which are connected pairwise by a network of connecting elements such as rods, bars or beams and of which some, for example 224A, 224B, 225A, 225B, 226A and 226B, are oriented transversely to the longitudinal bodies 220, 222A, 222B, while others 227 are oriented obliquely with respect to the longitudinal bodies.

Figure 1B:
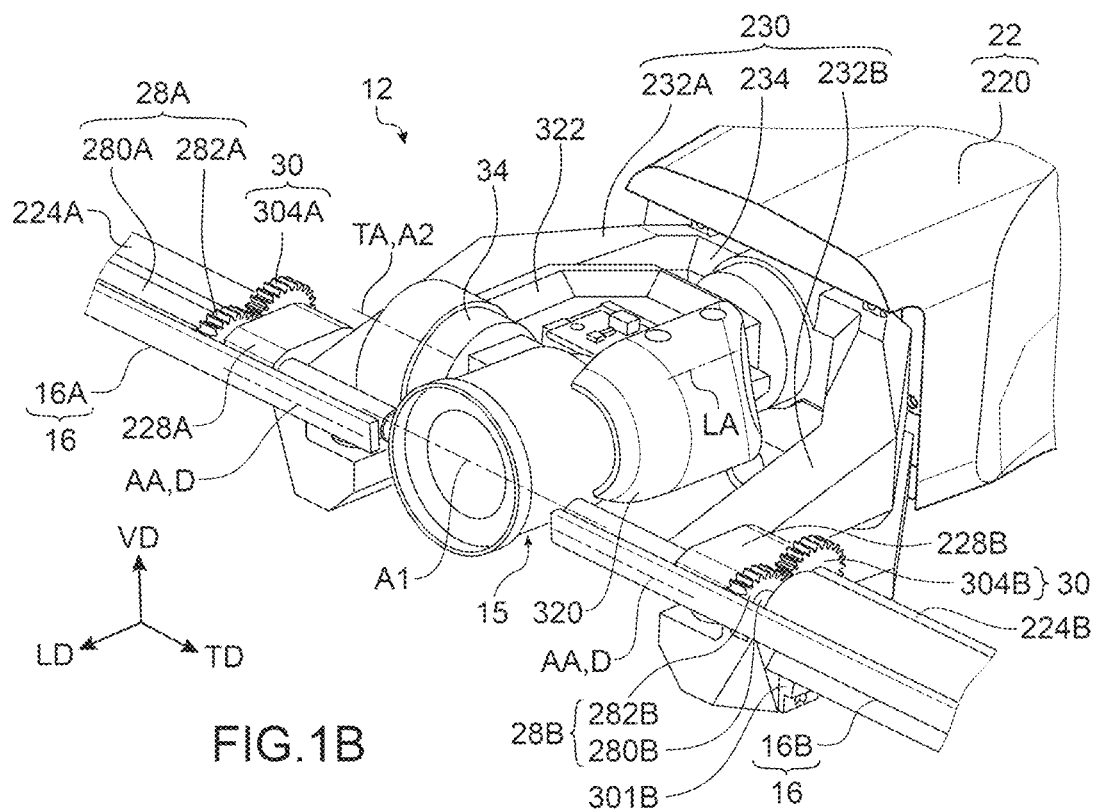
FIG. 1B is a view on a larger scale of another part of FIG. 1, notably illustrating a second image acquisition device of the flying drone.
Figure 2:
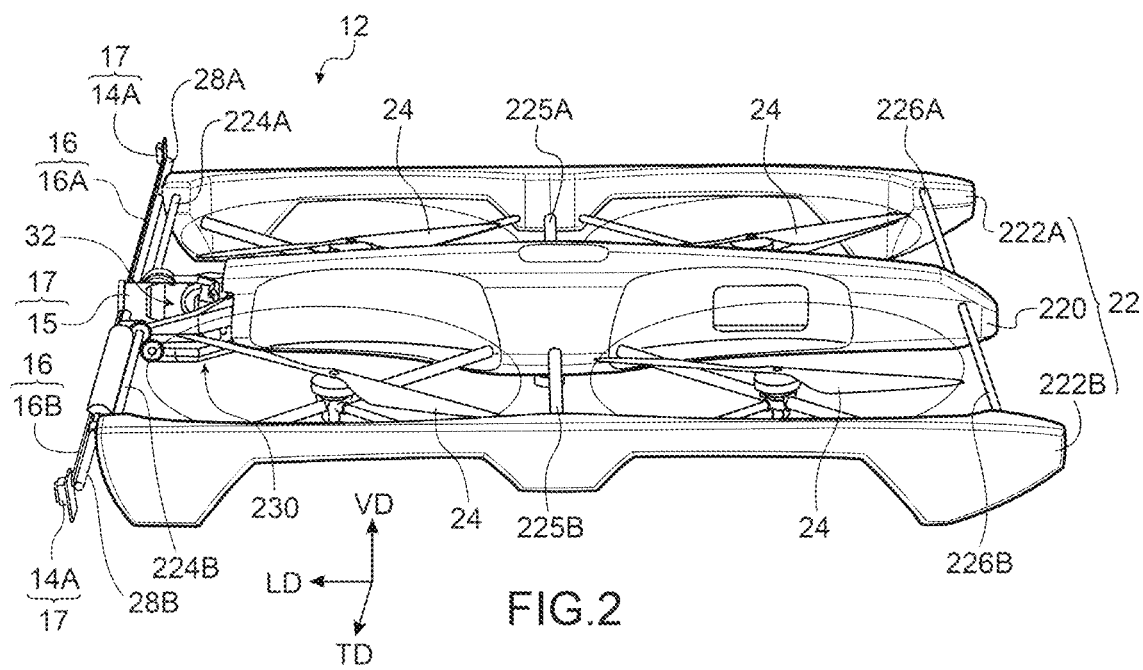
FIG. 2 is a schematic side view of the flying drone of FIG. 1.
Figure 2A:
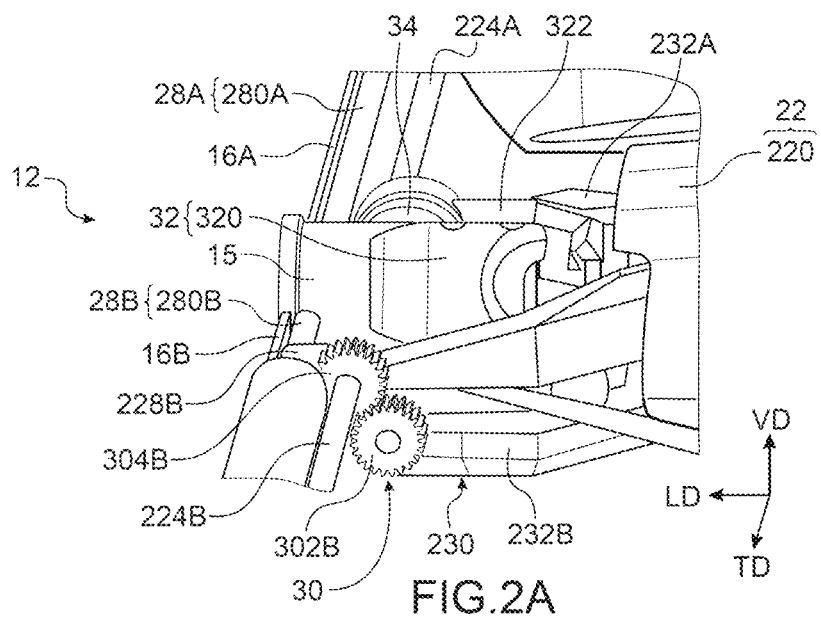
FIG. 2A is a view on a larger scale of part of FIG. 2, notably illustrating the second image acquisition device.

The central body 220 is provided with a fork 230 at one longitudinal end thereof, defining a front side of the flying drone 12. With reference to FIGS. 1B, 2A and 3, the fork 230 comprises two arms 232A, 232B each extending from a base 234 rigidly fixed to the central body 220. The connecting elements 224A, 224B situated on the front side of the drone respectively connect the lateral bodies 222A, 222B of the chassis 22 to the arms 232A, 232B of the fork 230. The second image acquisition device 15 is arranged between the two arms 232A, 232B, as will become more clearly apparent in what follows.

The rotors 24 are, for example, four in number, and are, for example, coplanar or substantially coplanar (FIG. 1). The rotors 24 thus have respective axes of rotation 240 which are oriented in a vertical direction VD of the drone, which is orthogonal to a horizontal plane H of the drone defined by the rotors 24. In a more general case, in which it is possible for the rotors not to be rigorously coplanar, such a horizontal plane may be defined as being a mean plane of the rotors 24, and the vertical direction VD may be defined as being a mean direction of the respective axes of rotation 240 of the rotors. More generally, the horizontal plane H may be simply defined as being a plane corresponding to a possible attitude that the flying drone 12 may adopt when flying in hovering flight.

In the example illustrated, the axis of alignment AA is parallel to the horizontal plane H and defines a transverse direction TD for the flying drone 12. In addition, the longitudinal bodies 220, 222A, 222B extend generally in a direction orthogonal to the transverse direction TD and parallel to the horizontal plane H, defined as being the longitudinal direction LD for the flying drone 12. The vertical direction VD is thus orthogonal to each of the longitudinal direction LD and transverse direction TD. The front side of the drone and a rear side thereof are opposite sides in the longitudinal direction LD.

In the embodiment described, the flying drone 12 comprises two supports 28A, 28B of elongate shape borne by the chassis 22 and extending parallel to the axis of alignment AA. The two first image acquisition devices 14A and 14B are each rigidly fixed to a corresponding support 28A, 28B. Likewise the two light sources 16A, 16B are rigidly fixed to a corresponding support 28A, 28B.

Figure 1A:
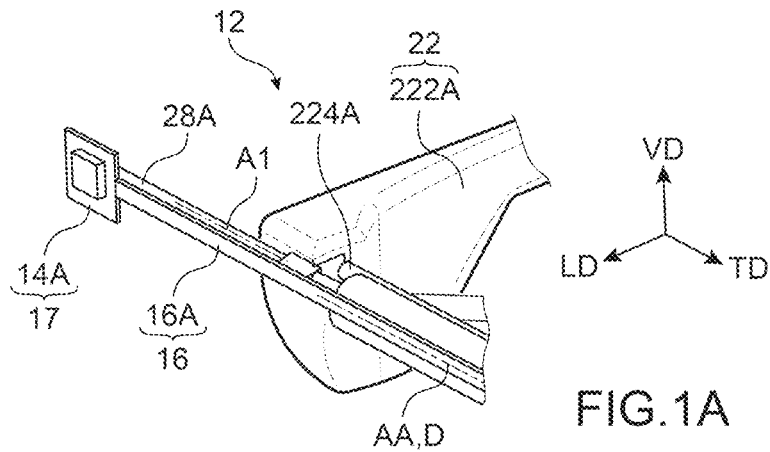
FIG. 1A is a view on a larger scale of part of FIG. 1, notably illustrating a first image acquisition device of the flying drone.

The flying drone 12 further comprises a first drive device 30 configured to make each of the two first image acquisition devices 14A, 14B and/or each of the two light sources 16A, 16B rotate about a first axis A1 parallel to the axis of alignment AA (FIGS. 1A and 1B), preferably in a synchronized manner.

The amplitude of the angular range of possible orientations for the elements moved by the first drive device 30, in other words the maximum amplitude of movement permitted by the first drive device 30 is at least equal to 30 degrees, preferably at least equal to 90 degrees, and more preferably still, at least equal to 160 degrees.

The first axis A1 is advantageously offset from the rotors 24 of the drone and therefore, in particular, situated outside of the zone swept by the blades of the rotors 24, so that the rotors 24 remain outside a field of view of each of the two first image acquisition devices 14A, 14B whatever the orientation of the devices in a range of at least 180 degrees about the first axis A1 and preferably whatever the orientation of the devices in the entirety of their angular range permitted by the first drive device 30.

For this purpose, the first axis A1 is offset with respect to the rotors 24 in a direction orthogonal to the vertical direction VD of the drone, in this instance in the longitudinal direction LD of the drone. Such an offset may, or may not, be accompanied by an offsetting of the first axis A1 with respect to the rotors 24 in the vertical direction VD. In the example illustrated, the first axis A1 is thus offset towards an upper side of the drone, with respect to the horizontal plane H.

In the example illustrated, the first drive device 30 is configured to make each of the two supports 28A, 28B rotate about the first axis A1, and thus drive a joint rotational movement of the first image acquisition devices 14A, 14B and of the light sources 16A, 16B.

To this end, each of the supports 28A, 28B comprises for example a rod 280A, 280B having one end mounted with the ability to pivot in a front end of the corresponding lateral body 222A, 222B of the chassis 22 (FIG. 1A), and an opposite end mounted with the ability to pivot in a corresponding connecting body 228A, 228B (FIGS. 1B and 3) borne by (or solidly attached to) a front end of a corresponding arm 232A, 232B of the fork 230. One end of a corresponding connecting element 224A, 224B is also fixed rigidly to each of the connecting bodies 228A, 228B. The light source 16A, 16B and the corresponding first image acquisition device 14A, 14B are rigidly fixed to each of the rods 280A, 280B. In addition, a driven gear 282A, 282B is, for example, rigidly fixed to each of the rods 280A, 280B.

Figure 3:
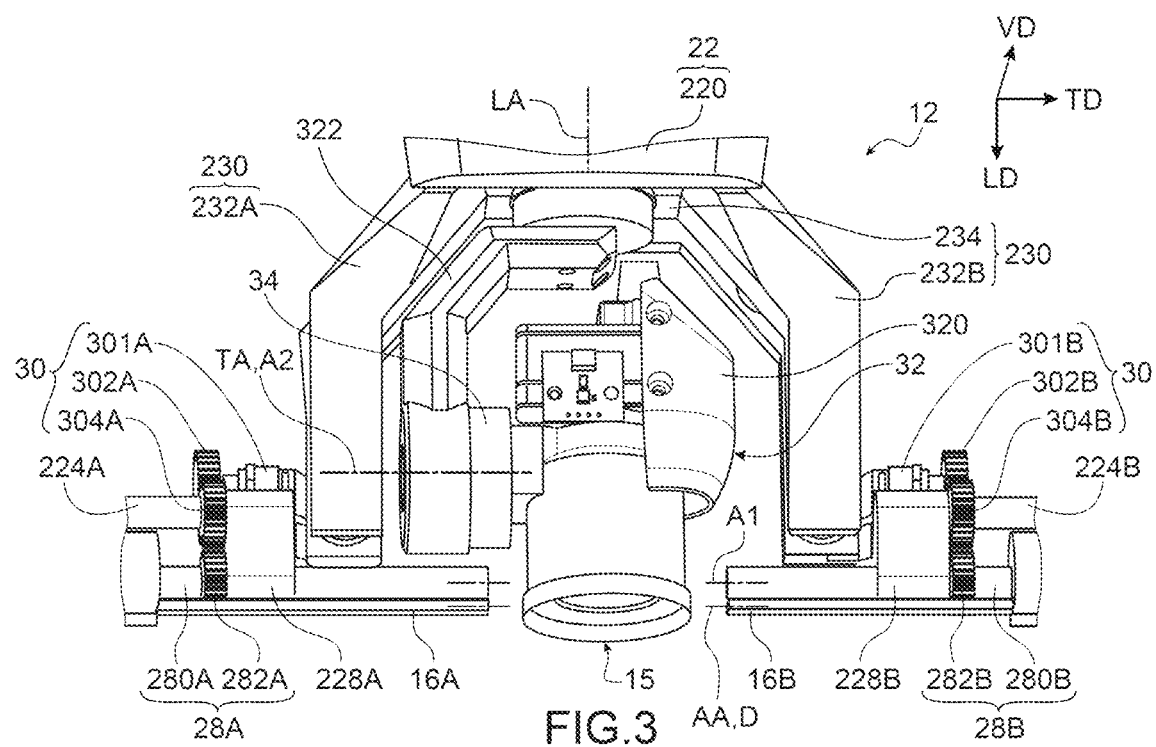
FIG. 3 is a schematic view, from above, of part of the flying drone of FIG. 1, notably illustrating the second image acquisition device.

With reference to FIGS. 1B, 2A and 3, the first drive device 30 comprises, for example, two servomotors 301A, 301B borne respectively by the arms 232A, 232B of the fork 230, two driving gears 302A, 302B rigidly fixed to respective output shafts of the servomotors, and two intermediate gears 304A, 304B, for example mounted with the ability to pivot on the connecting elements 224A, 224B situated on the front side of the drone, and each in mesh with both a corresponding driving gear 302A, 302B and a corresponding driven gear 282A, 282B so as to transmit a rotary movement of the corresponding servomotor to the corresponding rod 280A, 280B and thus drive the joint rotational movement of the first image acquisition devices 14A, 14B and of the light sources 16A, 16B.

Moreover, the flying drone 12 comprises a gyrostabilizer 32 by which the second image acquisition device 15 is fixed to the chassis 22. In the example illustrated, the gyrostabilizer 32 is arranged between the arms 232A, 232B of the fork 230. This gyrostabilizer 32 is, for example, of the type commonly referred to as a "gimbal" which in the well-known manner combines a Cardan-type suspension with a collection of electromechanical actuators and sensors, such as servomotors, which are configured to compensate for any parasitic movement of an amplitude lower than a maximum gyrostabilization amplitude, thus ensuring a stable orientation for the second image acquisition device 15.

The gyrostabilizer 32 is advantageously configured to stabilize the second image acquisition device 15 along a longitudinal axis LA and a transverse axis TA (FIGS. 1B and 3). To do that, the gyrostabilizer 32 comprises, for example, a gondola 320, to which the second image acquisition device 15 is rigidly fixed, an arm 322 on one end of which the gondola 320 is mounted with the ability to rotate about the transverse axis TA, and which is itself mounted at its other end on the base 234 of the fork 230 with the ability to rotate about the longitudinal axis LA. In the way known per se, the gyrostabilizer comprises a first servomotor and a second servomotor (which are not visible in the figures) respectively configured to make the gondola 320 rotate about the transverse axis TA and to make the arm 322 rotate about the longitudinal axis LA so as to compensate for any parasitic movement of an amplitude lower than the maximum gyrostabilization amplitude.

As an alternative, the gyrostabilizer 32 may of course be configured so that it also provides gyrostabilization about a vertical axis (parallel to the vertical direction VD). The vertical direction is nevertheless the direction that requires the least amount of gyrostabilization because it is advantageous, for the sake of weight saving and therefore greater autonomy, not to provide gyrostabilization about a vertical axis.

The flying drone 12 further comprises a second drive device 34 configured to make the second image acquisition device 15 rotate in a determined angular range about a second axis A2 parallel to the axis of alignment AA and, for example, coincident with the transverse axis TA of the gyrostabilizer 32. In that case, the second drive device 34 comprises, for example, the aforementioned first servomotor, the latter providing both the gyrostabilization about the transverse axis TA and the changes of orientation of the second image acquisition device 15 in the aforementioned angular range of which the amplitude is, in general, greater than the maximum gyrostabilization amplitude.

The amplitude of the aforementioned angular range is advantageously at least equal to 30 degrees, preferably at least equal to 90 degrees and, more preferably still, at least equal to 160 degrees.

The second axis A2 is advantageously offset from the rotors 24 of the drone and therefore, in particular, situated outside of the zone swept by the blades of the rotors 24, so that the rotors 24 remain outside a field of view of the second image acquisition device 15 whatever the orientation of the device in a range of at least 180 degrees about the second axis A2 and preferably whatever the orientation of the device in the entirety of its angular range permitted by the second drive device 34.

For this purpose, the second axis A2 is offset with respect to the rotors 24 in a direction orthogonal to the vertical direction VD of the drone, in this instance in the longitudinal direction LD of the drone. Such an offset may, or may not, be accompanied by an offsetting of the second axis A2 with respect to the rotors 24 in the vertical direction VD. In the example illustrated, the second axis A2 is thus offset towards the upper side of the drone, with respect to the horizontal plane H.

The first image acquisition devices 14A, 14B and the second image acquisition device 15 for example each consist of or comprise a digital camera or of digital photography equipment.

The respective sensors of the first image acquisition devices 14A, 14B are preferably high-resolution, for example 8 megapixel, RGB trichromatic sensors. In addition, the first image acquisition devices 14A, 14B are advantageously configured to deliver a compressed stream at output, for example a video stream encoded in accordance with one of the MPEG standards.

The sensor of the second image acquisition device 15 is preferably likewise an RGB trichromatic sensor, preferably one having a Bayer array. This sensor advantageously has a resolution superior to that of the respective sensors of the first image acquisition devices 14A, 14B, for example a resolution of 12 megapixels or above. In addition, the second image acquisition device 15 is advantageously configured to deliver a stream of uncompressed images, for example coded over 12 bits.

In the embodiment illustrated, each light source 16A, 16B consists of or comprises a longitudinal row of lighting elements, for example light-emitting diodes (LEDs) borne by—or integrated into—a structure of a shape that is elongated in the longitudinal direction D and fixed to the corresponding support 28A, 28B or integrated into same. As a variant, several longitudinal rows of lighting elements that are parallel may be provided on each support 28A, 28B. As a further variant, each light source 16A, 16B may consist of or comprise a single luminous element, the shape of which is elongate in the longitudinal direction D, or of several lighting elements of this type parallel to one another. Each light source 16A, 16B is preferably not very directional, so as to allow it to illuminate surfaces that are to be analyzed. The degree of openness (in the transverse plane) of the light beam emitted by each light source 16A, 16B is chosen according to parameters of the inspection method, a description of which will follow, notably of the shape of the surface that is to be analyzed and of the mean intended distance between the flying drone 12 and such a surface during implementation of the method.

The lighting device 16 preferably has a longitudinal extent $L_{LS}$ greater than the span of an assembly made up of the chassis 22 and the rotors 24 of the flying drone 12 and, for example, equal to 1 meter (FIG. 9) or more. In some embodiments of the disclosure herein, this longitudinal extent $L_{LS}$ is at least equal to one-and-a-half times the maximum separation $D_{max}$ between the respective axes of the rotors 24 of the flying drone 12 (FIG. 1). A longitudinal extent $L_{LS}$ that is great in comparison with the aforementioned span optimizes the operational effectiveness of the inspection method while at the same time limiting the size, and therefore the cost, of the flying drone 12, as will become more clearly apparent in what follows. The row of lighting elements of each of the light sources 16A, 16B comprises, for example, a linear density of lighting elements that is such that the light sources 16A, 16B appear to be continually at a nominal inspection distance at which the inspection method is intended to be implemented. A high linear density of lighting elements allows good uniformity of illumination of the surface that is to be inspected. Of course, the choice of these parameters may be optimized, notably according to the dimensions of a surface that is to be inspected.

The light sources 16A, 16B are advantageously configured to emit green light, for which the Bayer-array RGB sensors with which the first image acquisition devices 14A, 14B are equipped have a spike in sensitivity. Such a color further offers the advantage of making it easier to distinguish between a reflection of the lighting device 16 and parasitic reflections produced by conventional lighting devices, such as neon tubes.

The flying drone 12 of course incorporates a battery to supply the lighting device 16 and the image acquisition assembly 17 with electrical power. This battery may be distinct from—or combined with—one or more batteries used to power the rotors 24, the gyrostabilizer 32, and the first and second drive devices 30 and 34.

Figure 5:
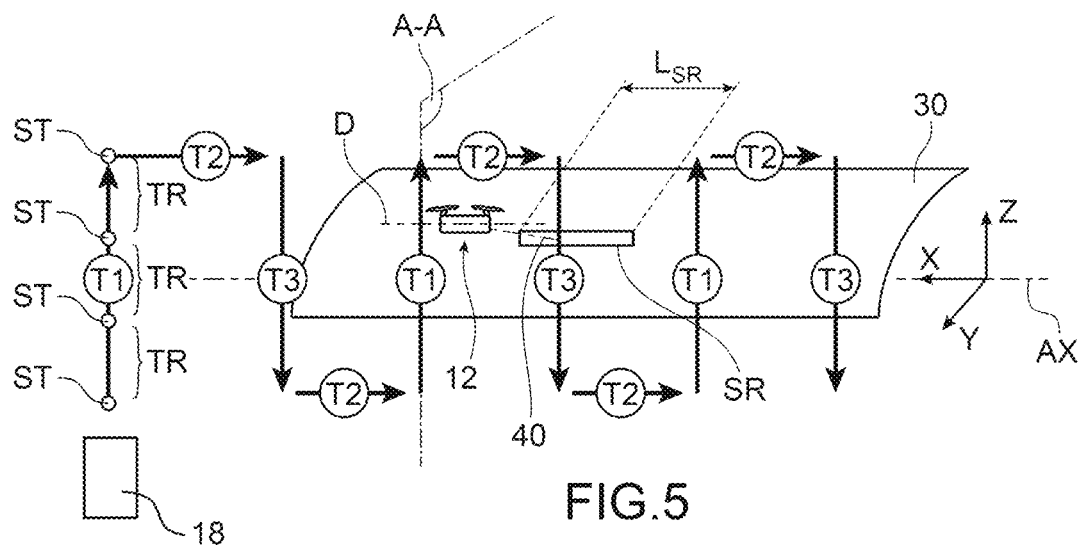
FIG. 5 is a schematic partial side view of the surface of FIG. 4 and of a system for inspecting surfaces able to reflect light, comprising the flying drone of FIG. 1 and a data processing device, during the implementation of a step B of a method for inspecting the surface.
Figure 6:
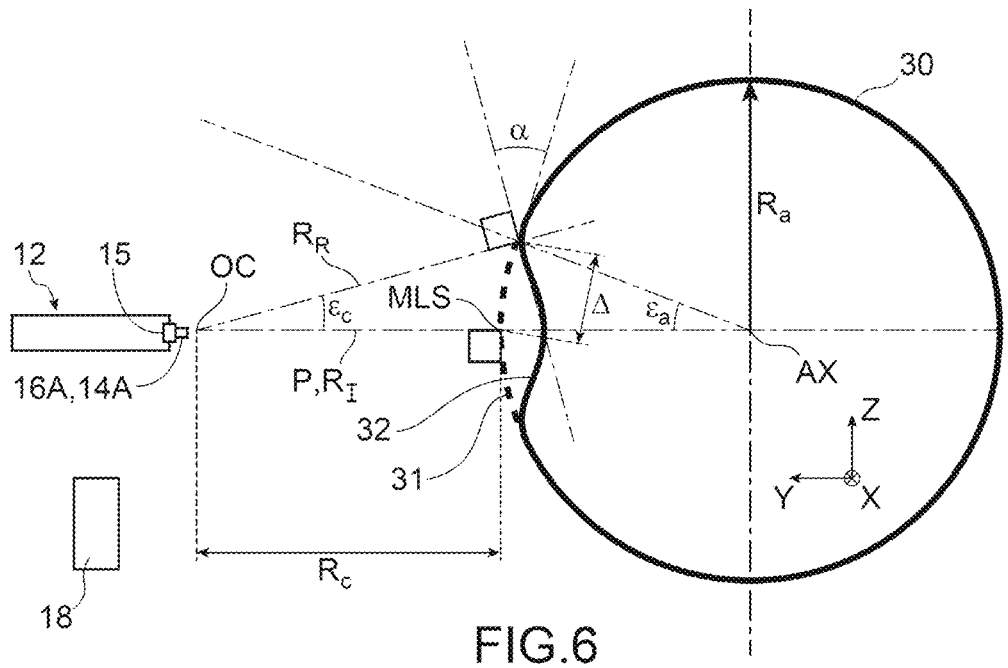
FIG. 6 is a schematic view in cross section of the surface of FIG. 4 and of the system of FIG. 5, during the implementation of step B of the method.
Figure 7:
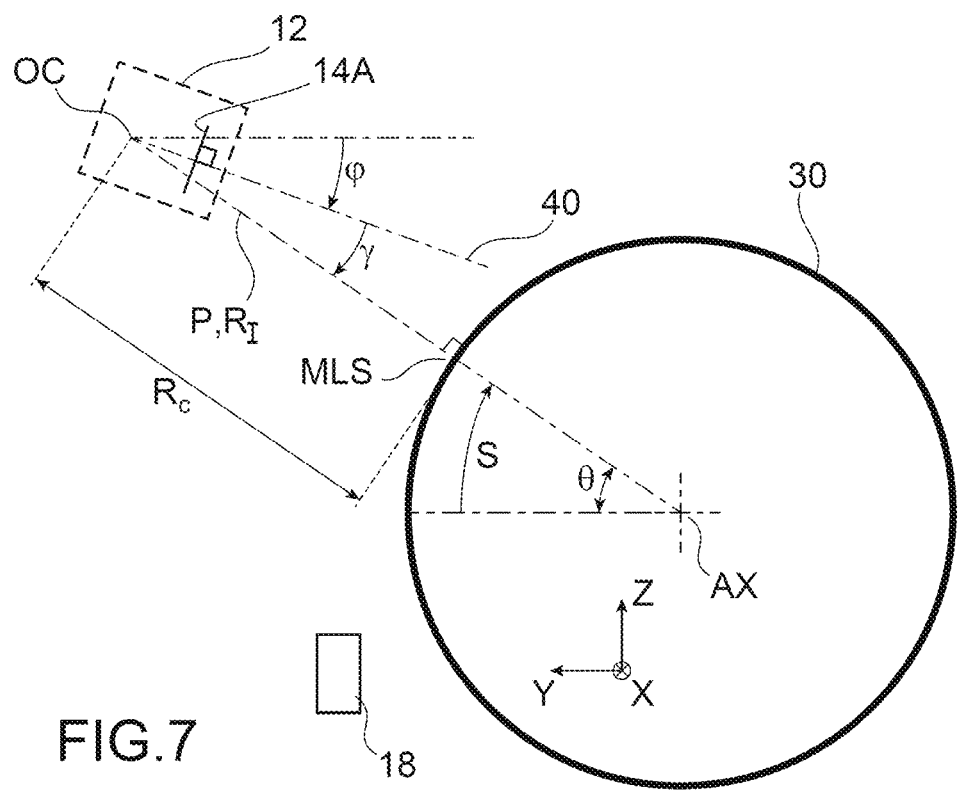
FIG. 7 is a view similar to FIG. 6.

With reference to FIGS. 5 through 7, a system 10 inspecting a surface able to reflect light comprises, according to a preferred embodiment of the disclosure herein, a flying drone 12 of the type described hereinabove, and a data processing device 18.

The data processing device 18 is a generic commercially available device such as a computer, a tablet or a smart phone or the like, provided with a program designed to implement the inspection method according to the disclosure herein, or is an item of apparatus specifically designed for implementing this method. In some embodiments of the disclosure herein, the data processing device 18 may be carried partially or fully on board the flying drone 12. In all cases, the data processing device 18 is able to exchange data with the first image acquisition devices 14A, 14B and the second image acquisition device 15 of the flying drone 12, for example via a wireless connection. The data processing device 18 may advantageously be designed to control the flight of the flying drone 12 or to interface with a control unit controlling the flying drone 12.

Figure 16:
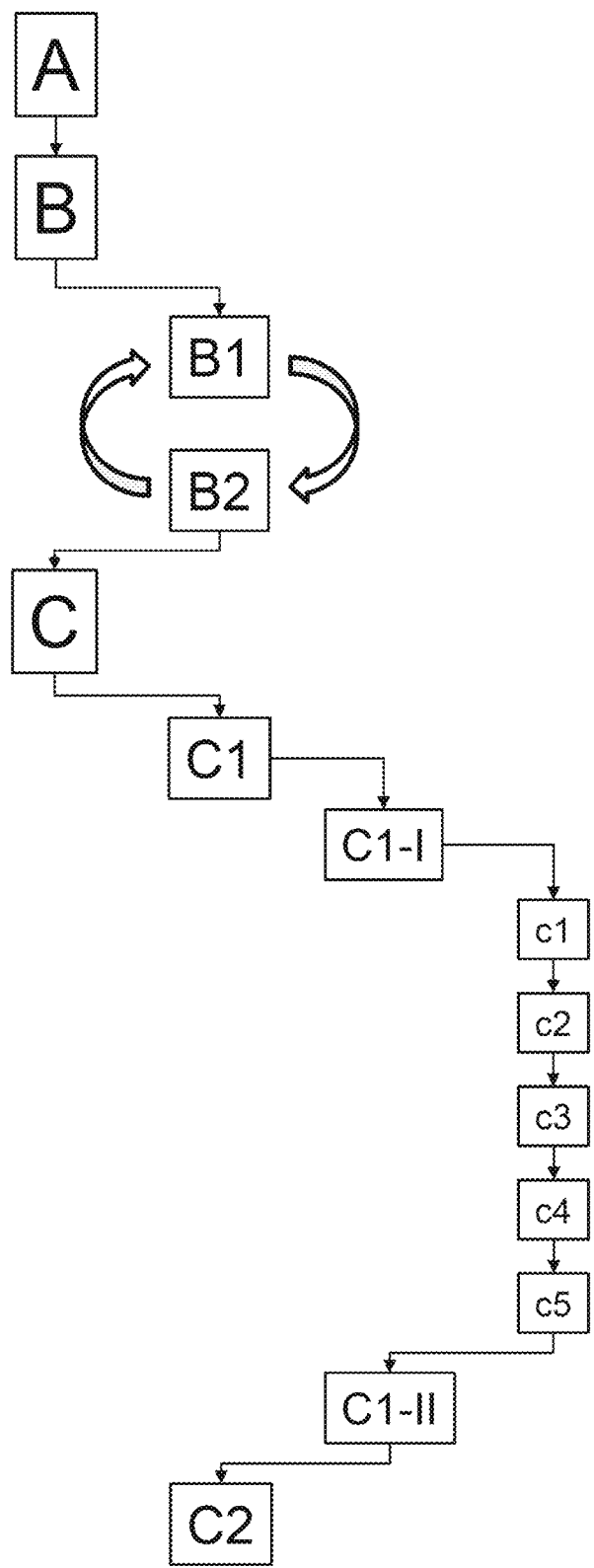
FIG. 16 is a flow diagram of the method according to a preferred embodiment of the disclosure herein.

A method for inspecting a surface able to reflect light, according to one embodiment of the disclosure herein, will now be described with continuous reference to FIG. 16.

A first step A of such a method involves obtaining the use of the flying drone 12 or, as may be, of the full system 10.

Figure 4:
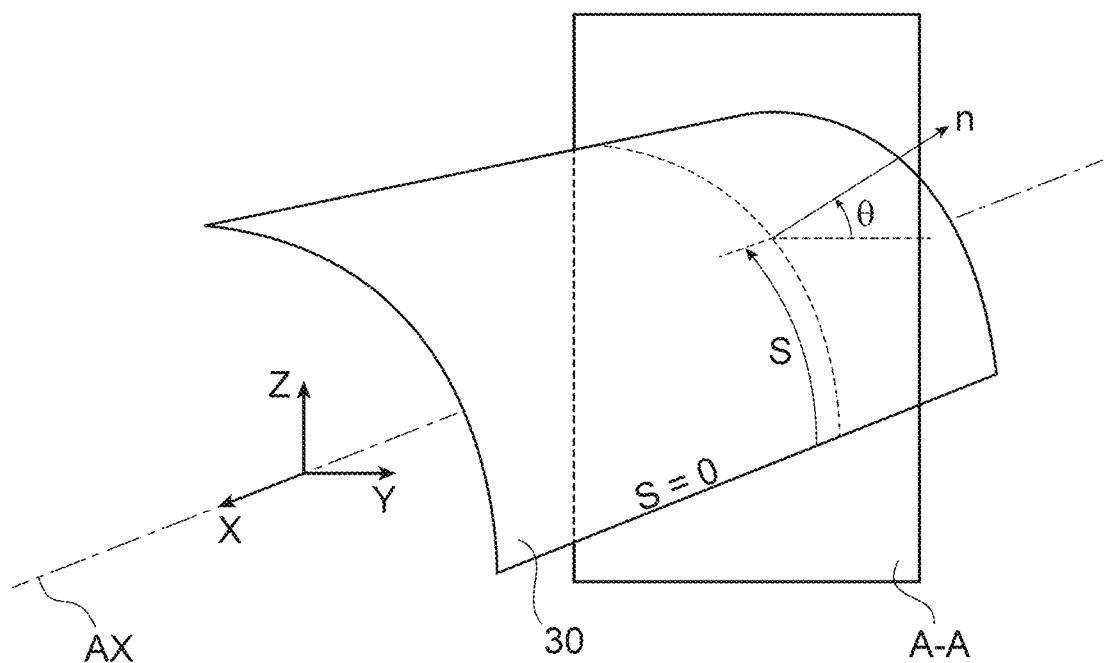
FIG. 4 is a schematic perspective view of a surface able to reflect light.

FIG. 4 illustrates part of a surface 30 to be inspected. The method according to the disclosure herein therefore becomes applicable when the surface 30 has enough gloss to allow a specular reflection of the lighting device 16 to be discerned on this surface. In this regard, the method is preferably applied to surfaces having a degree of specular gloss at least equal to 10% (within the meaning of standard ISO 2813). It should be noted that the method according to the disclosure herein can be applied to surfaces having an "orange-peel effect", this effect being due, for example, to the type of paint with which such a surface may be coated, as will become more clearly apparent in what follows.

The disclosure herein is applicable to surfaces for inspection that exhibit varying geometries. However, in the context of the illustrated embodiment of the disclosure herein, the surface 30 that is to be inspected has, discounting any dents there might be, a geometry that is such that, in any plane of section orthogonal to a certain direction, the function θ(s) that determines the angle θ that the vector n normal to the surface at the abscissa point s makes with respect to a reference plane, such as a horizontal (X, Y) plane, defined with respect to an orthonormal reference system {X, Y, Z}, as a function of the curvilinear abscissa value s in the plane of section (FIG. 4) is a bijective function.

The surface 30 is thus a surface of cylindrical shape of circular cross section or, in a variant, a surface of cylindrical shape of elliptical or oval cross section, or more generally, of annular cross section that can be approximated locally by a cylinder of revolution. In this case, the plane or planes of section considered for implementing the method are preferably planes transverse to an axis AX of the surface, whereas the horizontal reference plane, for defining the angle 9 and the curvilinear abscissa value s, contains the axis AX.

In one particular application of the method according to the disclosure herein, the surface 30 is the exterior surface of an aircraft, particularly the exterior surface of the fuselage of an airplane.

In other embodiments of the disclosure herein, the surface 30 is a surface of conical shape, in which case the surface 30 is approximated locally by a cylinder of revolution for implementing the method.

With reference to FIG. 5, the method according to the disclosure herein comprises a step B consisting in or comprising moving the flying drone 12 past the surface 30 along a trajectory T1 or T3, alternating phases of pseudo-hovering flight ST, in which the flying drone 12 is substantially stationary or moves at a relatively low speed in the vicinity of a predetermined flight point, and transient phases TR connecting two successive flight points and during which the speed of travel of the drone is greater than the speed, if any, of the drone in the phases of pseudo-hovering flight, so as to implement the following steps B1 and B2 during the transient phases TR and during the phases of pseudo-hovering flight ST, respectively.

With reference to FIGS. 5 through 8, step B1 consists in or comprises, during the transient phases TR, with the light sources 16A, 16B switched on, acquiring at least a series of images {I(1) . . . I(n)} of portions (P(1) . . . P(n)) of the surface 30 by each of the first image acquisition devices 14A, 14B and, optionally, by the second image acquisition device 15 as the flying drone 12 moves past the surface 30.

The trajectory T1 or T3 is such that a respective optical axis 40 (FIGS. 5 and 7) of each of the first image acquisition devices 14A, 14B remains in a corresponding plane of section of the surface 30 (for example the plane of section of FIGS. 6 and 7). In the example illustrated, each light source 16A, 16B is thus kept in an orientation such that the longitudinal direction D thereof is secant with the corresponding plane of section and such that, for each image I(1) . . . I(n) in the series, the corresponding light source 16A, 16B illuminates the corresponding portion P(1) . . . P(n) of the surface 30. In the example illustrated, each light source 16A, 16B is kept in an orientation such that the longitudinal direction D thereof is orthogonal to the plane of section.

In the preferred embodiment of the disclosure herein, the trajectory T1 or T3 of the flying drone 12 during acquisition of a given series of images {I(1) . . . I(n)} is a trajectory contained inside a plane of section A-A transverse to the axis AX of the surface 30.

Where applicable, with reference to FIG. 5, the overall trajectory of the flying drone 12 for the successive acquisition of several series of images by each of the first image acquisition devices 14A, 14B comprises first trajectory portions T1 and T3 contained respectively in planes of section A-A transverse to the axis AX of the surface 30, and second trajectory portions T2 connecting pairs of first trajectory portions T1, T3, for example being oriented substantially parallel to the axis AX of the surface 30. With a view to effectiveness, the first portions T3 are covered in the opposite direction compared with the first portions T1 and are therefore performed in alternation with the latter.

Figure 8:
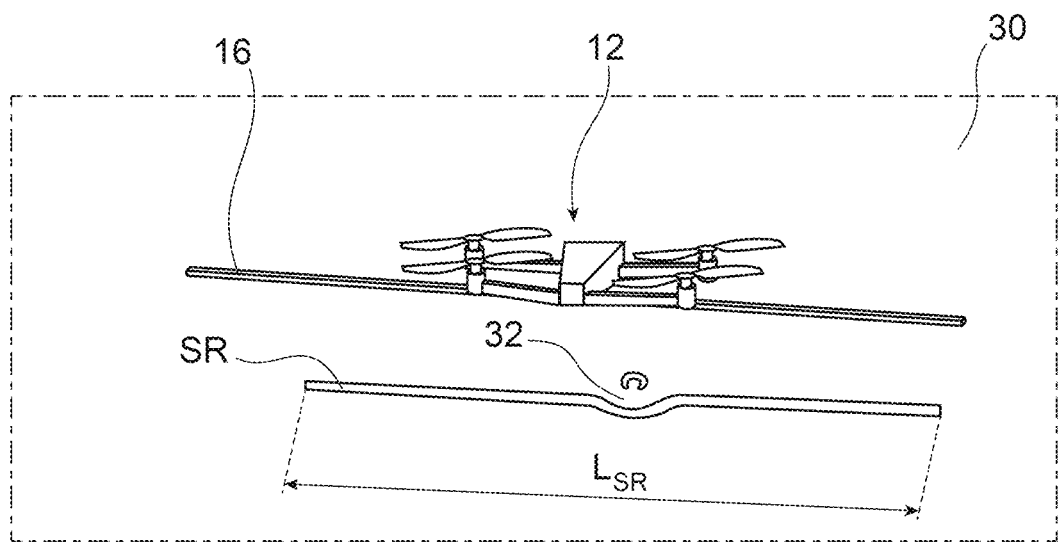
FIG. 8 is a schematic partial side view of the surface of FIG. 4 and of the system of FIG. 5, during the implementation of step B of the method.

The planes of section transverse to the axis AX, in which planes the first trajectory portions T1 and T3 are defined, are spaced apart by a distance such that the entirety of the surface that is to be analyzed is swept at least once by the reflection of the lighting device 16 that is seen by at least one of the image acquisition devices implemented in step B1, taking the discontinuity caused by the second image acquisition device 15 into account. It should be noted that FIG. 8 shows the specular reflection viewed by one of the two first image acquisition devices 14A, 14B.

The images acquired in step B1 are particularly suitable for detecting dents in the surface 30 by analyzing the specular reflection SR, it being possible for such detection to be performed visually or, for preference, by the data processing device 18, in a step C1 of the method, as will become more clearly apparent in what follows.

The flight points are advantageously defined in such a way as to encourage transitions in which the reflection of the lighting device 16 sweeps as quickly as possible over the surface that is to be inspected. During the transient phases TR, the maximum speeds and accelerations of the flying drone 12 are regulated in such a way as to ensure the safety of the operations, whereas image quality is not in fact the limiting factor in implementing the dent detection method that will be described hereinafter. During these transmissions, the light sources 16A, 16B remain illuminated and the first image acquisition devices 14A, 14B acquire images at a relatively high rate, for example at a rate of 20 images per second.

In addition, the second image acquisition device 15 is advantageously used in the same way as the first image acquisition devices 14A, 14B during the transient phases TR so as to acquire images of additional portions of the surface to be analyzed. The number of first trajectory portions T1, T3 can thus be minimized. The second image acquisition device 15 in this case is advantageously used at a resolution lower than its nominal resolution, making it possible to save on storage memory, and also to reduce the image processing time.

In one preferred embodiment of the disclosure herein, the images acquired by the second image acquisition device 15 are transmitted to the ground in real-time throughout the entirety of step B, whereas the images acquired by the first image acquisition devices 14A, 14B during step B1 are stored and processed by a processing unit carried on board the flying drone and forming part of the data processing device 18. In such a case, the images acquired by the second image acquisition device 15 in step B1 may also allow the quality of the image capture to be checked in real-time.

Finally, on approaching each flight point, the flying drone 12 slows down and the mode of operation of the image acquisition assembly 17 is modified when the speed of the drone drops below a threshold, for example 2 cm/s. The lighting device 16 is switched off and the second image acquisition device 15 switches to acquisition mode at a higher resolution and a lower frequency, for example a frequency of 5 images/s, to implement step B2 of the method.

Step B2 therefore consists in or comprises acquiring, during the phases of pseudo-hovering flight ST, with the light sources 16A, 16B switched off, other images of portions of the surface 30 by the second image acquisition device 15, these other images having a resolution greater than that of the images acquired in step B1.

Because of the absence of a reflection of lighting device 16 and because of their better resolution, the other images acquired in step B2 are particularly well suited to detecting superficial defects in the surface 30, it being possible for such detection to be performed visually or, for preference, by the data processing device 18 in a step C2 of the method, as will become more clearly apparent in what follows.

Because of the substantially hovering nature of the flying drone 12, the images acquired in a phase of pseudo-hovering flight ST, for example a number of five images, cover substantially the same portion of the surface that is to be analyzed and can advantageously be combined in order to improve the signal-to-noise ratio (SNR) and/or compared so as to identify any parasitic reflections by virtue of a slight offset between the images.

As a result, the constraints regarding the level of precision regarding the feedback control of the position of the flying drone 12 during the phases of pseudo-hovering flight ST can be relatively relaxed, tolerating for example an error of a few centimeters with respect to the setpoint and not ensuring perfect stability of the drone. Moreover, the flying drone 12 is advantageously equipped with means for measuring its true position with centimeter precision. Subsequent image processing may thus allow superficial defects on the inspected surface to be located to the nearest millimeter. Such a tolerance allows a significant energy-saving with respect to the application of a strict positioning setpoint and also allows the inspection to be performed more rapidly by not waiting for the drone to become perfectly stabilized with respect to the surface that is to be inspected.

The method further comprises a step C consisting in or comprising operating the data processing device 18 to perform at least one of the following steps C1 and C2.

Step C1 consists in or comprises analyzing the shape of a specular reflection ISR of the lighting device 16 in all or part of the images of each series of images that is acquired in step B1, so as to estimate the position of any dents 32 in the surface 30, by the data processing device 18.

More specifically, step C1 comprises, for each series of images that is acquired in step B1 by each of the first image acquisition devices 14A and 14B, a step C1-I that consists in or comprises, for each image I(1) . . . I(n) of the series of images, operating the data processing device 18 so as to perform the following sub-steps c1 to c5.

Figure 10:
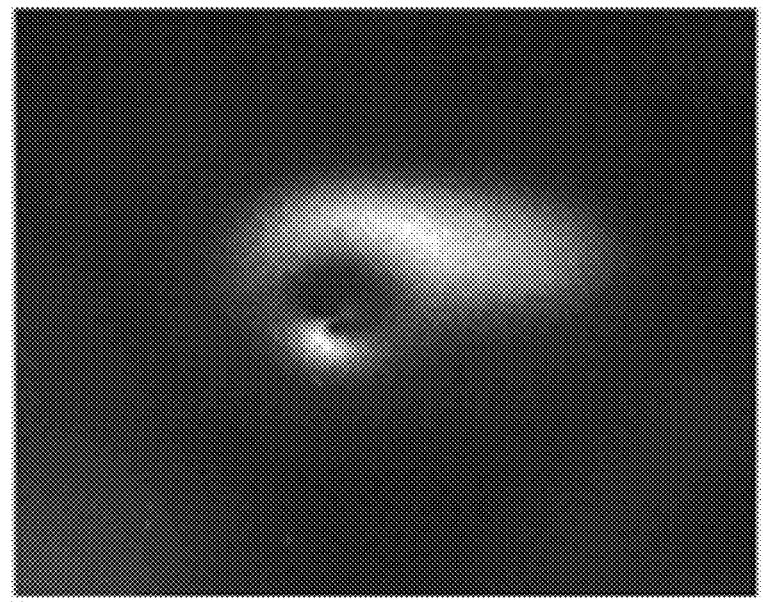
FIG. 10 is a partial view of an image of a series of images acquired during a step B1 forming part of step B of the method.

The first sub-step c1 consists in or comprises identifying a specular reflection of the lighting device 16 in the image (FIG. 10), for example by segmenting the latter. It should be noted that, for the sake of simplification, the discontinuity in the specular reflection caused by the spacing between the two light sources 16A, 16B has been omitted from the figures.

Figure 11:
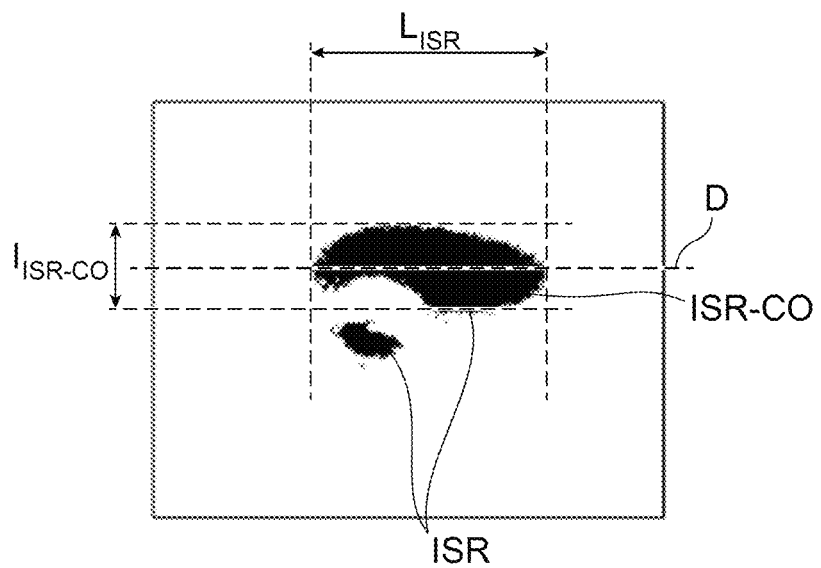
FIG. 11 is a view of the image of FIG. 10 after processing applied by the data processing device in the context of steps of the method.

To do this, the data processing device for example implements an adaptive thresholding algorithm. FIG. 11 illustrates the corresponding image thus segmented and therefore reveals the specular reflection ISR thus determined.

The second sub-step c2 consists in or comprises estimating, from the specular reflection ISR identified in the image in the preceding step, the median position, orthogonally to the longitudinal direction D of the light source 16, of an ideal specular reflection of the lighting device 16 in the image, corresponding to the median position of such a specular reflection in the absence of any dent in the surface 30.

Figure 9:
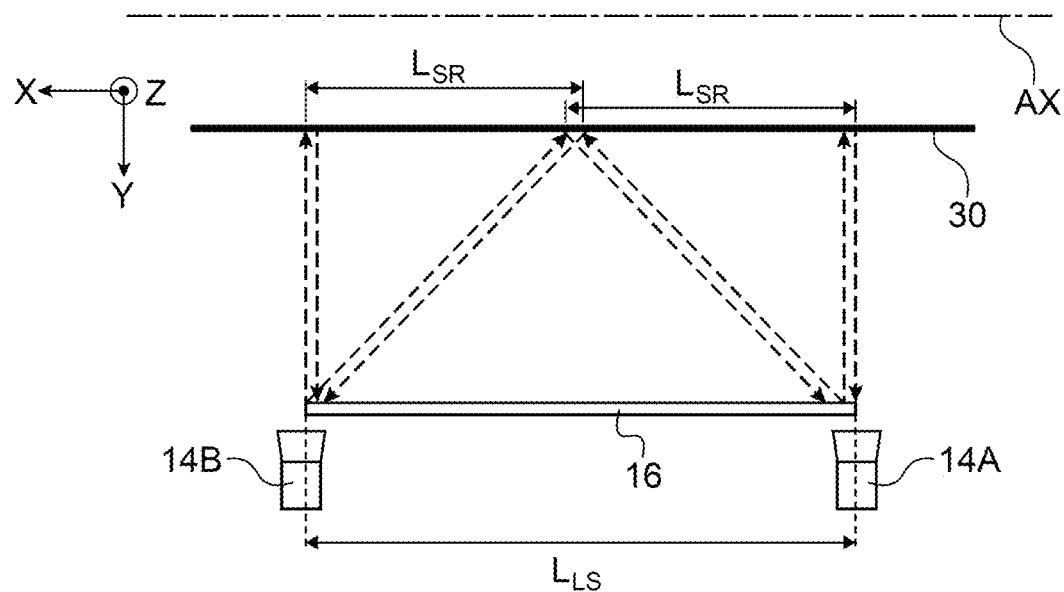
FIG. 9 is a schematic partial view from above of the surface of FIG. 4 and of the system of FIG. 5, during the implementation of step B of the method.
Figure 12:
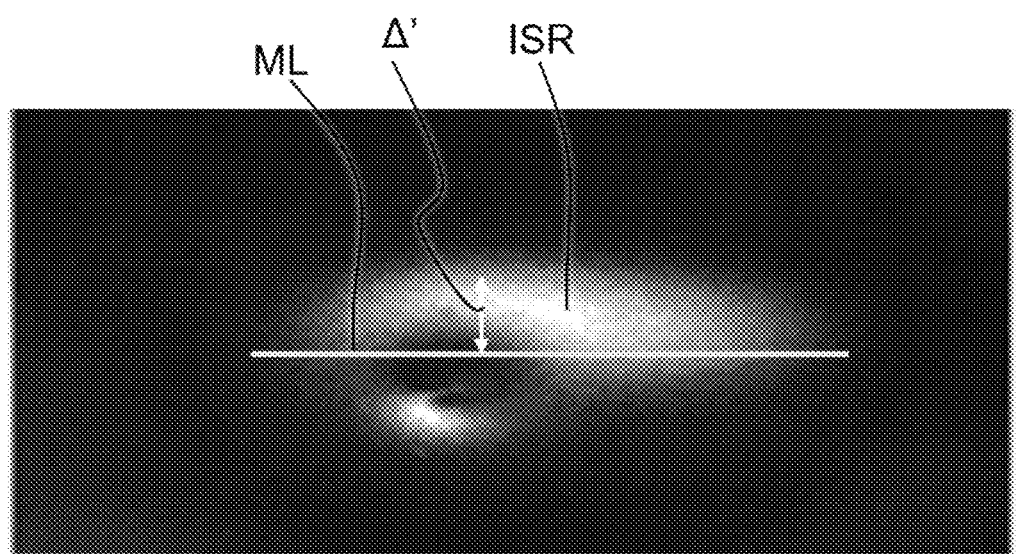
FIG. 12 is a view similar to FIG. 11, illustrating another step of the method.

To this end, the data processing device 18 determines, for example using linear regression, a median line ML of the specular reflection ISR that is oriented parallel to the longitudinal direction D of the lighting device 16 (FIG. 12). Such a line can be likened to the median position of the ideal specular reflection of the lighting device 16 when any dents 32 liable to affect the surface 30 are small in size by comparison with the longitudinal extent $L_{SR}$ of the specular reflection SR, on the surface 30, of the lighting device 16 (FIGS. 5, 8 and 9).

The third sub-step c3 consists in or comprises determining a distance $R_c$ between the flying drone 12 and the surface 30. More specifically, the distance $R_c$ is defined, for the first image acquisition device 14A or 14B considered, as being the distance between an optical center OC of the first image acquisition device 14A or 14B and the surface 30 (namely the distance between the optical center OC and that point of the surface 30 that is situated the closest to the optical center OC).

To that end, the data processing device 18 determines an apparent longitudinal extent $L_{ISR}$ of the specular reflection ISR of the lighting device 16 in the image (FIG. 11) and from this deduces the distance $R_c$ between the flying drone 12 and the surface 30 (FIG. 6). With reference to FIGS. 8 and 9, the longitudinal extent $L_{SR}$ of the origin SR, on the surface 30, of the specular reflection ISR of the lighting device 16 seen by each of the first image acquisition devices 14A, 14B can be deduced from the longitudinal extent $L_{LS}$ of the lighting device 16 using simple considerations of a geometric nature. What is meant by "origin of the specular reflection off the surface 30" is simply the points of the surface 30 from which the light rays that have formed the specular reflection ISR in the image have originated.

In the example illustrated, in which the drone comprises two first image acquisition devices 14A, 14B arranged at the ends of the lighting device 16, the longitudinal extent $L_{SR}$ of the origin SR, on the surface 30, of the specular reflection ISR, is equal to half the longitudinal extent $L_{LS}$ of the lighting device 16. Knowing the longitudinal extent $L_{SR}$ of the origin SR of the specular reflection ISR on the surface 30, and the intrinsic characteristics of the first image acquisition devices 14A, 14B, such as the focal length, the position of the optical center OC (FIG. 7), and distortion parameters, if any, the previously determined apparent longitudinal extent $L_{ISR}$ of the specular reflection ISR of the lighting device 16 in the image can be used to deduce the distance $R_c$ between the flying drone 12 and the surface 30.

The third sub-step c3 can be performed before, during or after implementation of the second sub-step c2.

The fourth sub-step c4 consists in or comprises determining the position, on the surface 30, of each point of the origin SR of the specular reflection ISR of the lighting device 16 in the image.

In the embodiment illustrated, this sub-step c4 is implemented in a way that will be described hereinafter with more particular reference to FIG. 7.

From starting data that are the estimated median position of the ideal specular reflection in the image, corresponding to the line ML in the example illustrated, the distance Re between the flying drone 12 and the surface 30, and characteristics of the first image acquisition devices 14A, 14B (focal length, dimensions of the photosites, position of the optical center OC, etc.), the data processing device 18 determines the angle γ between the optical axis 40 of the first image acquisition device 14A or 14B concerned and a plane P defined as being the plane that passes through the optical center OC of the first image acquisition device and which contains a median position of an origin of the ideal specular reflection of the lighting device 16 off an ideal surface 31 corresponding that to the shape that the surface 30 would have if free of dents. By definition, the origin of the ideal specular reflection is coincident with the origin SR of the specular reflection ISR of the lighting device 16 in any dent-free part of the surface 30.

The plane P therefore comprises the virtual rays of light $R_I$ that would form the specular reflection of the lighting device 16 received by the first image acquisition device 14A or 14B concerned if the surface 30 were free of deformation (FIG. 7). In any dent-free part of the surface 30, these rays of light $R_I$ are oriented in a plane P substantially normal to the surface 30 when the distance between the optical axis 40 of the first image acquisition device 14A, 14B and a mean longitudinal axis of the light sources 16A, 16B (corresponding to the axis of alignment AA in the example illustrated) remains negligible in comparison with the distance $R_c$ between the flying drone 12 and the surface 30.

Furthermore, the orientation φ of the optical axis 40 with respect to a horizontal plane (X, Y) is determined by a gyroscope or equivalent device with which the flying drone 12 is equipped, and of information supplied by the first drive device 30.

By summing the angle γ between the optical axis 40 and the plane P containing the virtual rays of light $R_1$ with the inclination φ of the optical axis 40, the data processing device 18 determines the corresponding angle θ, and from it deduces the abscissa value s for the median position of the origin of the ideal specular reflection off the surface 30, using the bijective relationship between θ and s.

The data processing device 18 may from that deduce the position of all of the points of the image on the surface 30 and from that in particular deduces the position, on the surface 30, of the origin of each point of the specular reflection ISR of the lighting device 16 in the image. Thus, the data processing device establishes a correspondence between each point of the image and each point of the corresponding portion of the surface 30.

The fifth sub-step c5 consists in or comprises estimating a local gradient of the surface 30 at each point of the specular reflection SR seen by the first image acquisition device 14A or 14B concerned, at least from an estimate of any distance there might be between each point of the specular reflection ISR of the lighting device 16 in the image and the median position of the ideal specular reflection, corresponding to the line ML.

With reference to FIG. 6, implementation of sub-step c5 relies on the following reflection model: the surface 30 being approximated by a cylinder of revolution as explained hereinabove, $R_a$ denotes the local curvature of the surface 30 in a given plane of section, and it is recalled that $R_c$ denotes the distance between the flying drone 12 and the surface 30. The angle α denotes the angle between the surface 30 (possibly dented) and the ideal (dent-free) surface. The angle $\varepsilon_c$ is the angle between a real ray of light $R_R$ produced by the specular reflection SR seen by the image acquisition device 14A (or 14B) concerned, in the plane of section concerned, when there is a dent 32 in the surface 30, and an ideal ray of light $R_I$ that the specular reflection seen by the image acquisition device 14A (or 14B) would produce, in the plane of section concerned, if the dent were not present. This latter ray is oriented in the plane P substantially normal to the ideal surface 31 (corresponding to the shape that the surface 30 would have without the dent 32) as explained hereinabove. The distance Δ is defined as being the point on the surface 30 from which the real ray of light $R_R$ originates, and the point on the ideal surface 31 from which the ideal ray of light $R_I$ originates.

The width of each light source 16A, 16B (orthogonally to its longitudinal direction D) and any orange-peel effect there might be on the surface 30 are modelled together by distribution of orientations Ω around a mean angle β. It may be readily demonstrated that:

$$\alpha = \beta + \Omega = \epsilon_a + \epsilon_c = \Delta \times \left(\frac{1}{R_a} + \frac{1}{R_c}\right)$$

The deviation Ω induced by the width of each light source 16A, 16B and by any orange-peel effect there might be can be considered as being bounded:

$$\Omega \in [-\Omega_{max}; +\Omega_{max}]$$

It should be noted that in the case of a surface 30 in the form of a cylinder of revolution or a shape that can be approximated to a cylinder of revolution (disregarding any dents there might be), and of light sources 16A, 16B that are longilinear and substantially parallel to the axis of revolution AX of the cylinder, the distortion of the specular reflection is dependent, in the first order, only on the angle α, whereas the inclination of the surface 30 in the direction X of the axis AX takes effect only in the second order.

The data processing device 18 determines an estimate of the maximum deviation $\Omega_{max}$ by estimating the width of the ideal specular reflection of the lighting device 16 in the image (which corresponds to the specular reflection that would be perceived in the absence of dents in the surface 30). To this end, the data processing device 18 determines the median width $I_{ISR-CO}$ of the greatest connected portion ISR-CO of the specular reflection ISR of the lighting device 16 in the image (FIG. 11). Because this median width $I_{ISR-CO}$ is considered to be an estimate of the width of the ideal specular reflection, the data processing device uses it to deduce the estimate of the maximum deviation $\cap_{max}$, which is equal to the median width $I_{ISR-CO}$ divided by twice the distance $R_c$ between the flying drone 12 and the surface 30.

Finally, the data processing device 18 estimates any distance Δ' there might be between each point of the specular reflection ISR of the lighting device 16 in the image and the median position of the ideal specular reflection, which corresponds to the line ML (FIG. 12), and from this deduces the corresponding distance Δ on the surface 30 using simple geometric considerations.

Given that $\Omega \in [-\Omega_{max}; +\Omega_{max}]$ and that $\beta + \Omega = \Delta \times (1/R_a + 1/R_c)$, the data processing device 18 from this deduces a lower boundary $\beta_{min}$ and an upper boundary $\beta_{max}$ for the local gradient β of the surface 30, which gradient is equal to the differentiation of the denting of the surface 30 with respect to the curvilinear abscissa value: $\beta = \partial r/\partial s$.

Figure 13:
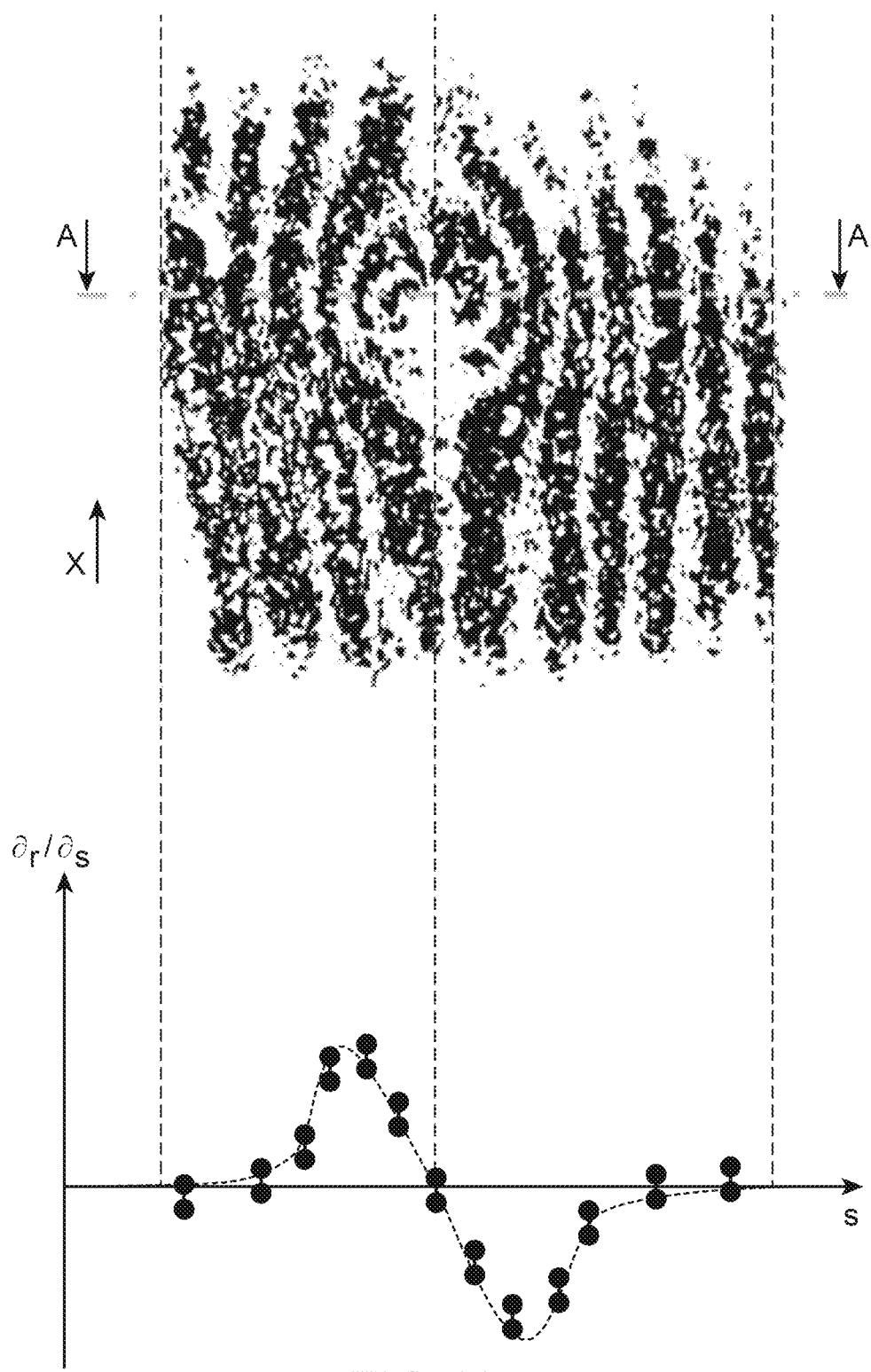
FIG. 13 comprises, in the upper part, a collection of images from the series of images acquired during the step B1 of the method, rotated through 90 degrees and, in the lower part, a graph of values of local gradients of the surface as a function of a curved abscissa value on the surface in the plane A-A of the upper part of this figure, these gradient values being estimated by the data processing device in the context of a step of the method.

After step C1-I has been implemented for all the images in each series, the data processing device 18 is in possession of a set of in equations regarding the local gradient β of the surface 30 at each point of the surface 30 that has reflected a specular reflection of the lighting device 16 at least once during the course of the image acquisition step B1. By way of illustration, the upper part of FIG. 13 is a collection of images thus acquired, which shows such a collection of points that have reflected a specular reflection of the lighting device 16, in a given region of the surface 30.

In a subsequent method step C1-II, the data processing device 18 relies on the set of estimates of local gradients that have been obtained at the end of the step C1-I, for at least a region of the surface 30, to estimate the position of any dents there might be in the surface 30.

To this end, in the preferred example illustrated, the data processing device 18 performs an optimization task in order to determine, along different parallel planes of section of the surface, corresponding profiles of the gradient ∂r/∂s (FIG. 13: lower part) that are compatible with the minimum gradient values $\beta_{min}$ and maximum gradient values $\beta_{max}$ defined in step C1-I, while at the same time minimizing a function indicative of the sum of the gradients along each of the planes of section (in terms of absolute value). The optimization performed by the data processing device relates, for example, to the following integral:

$$\int_{s_{min}}^{s_{max}} \left\| \frac{\partial r}{\partial s} \right\|^2 ds$$

Figure 14:
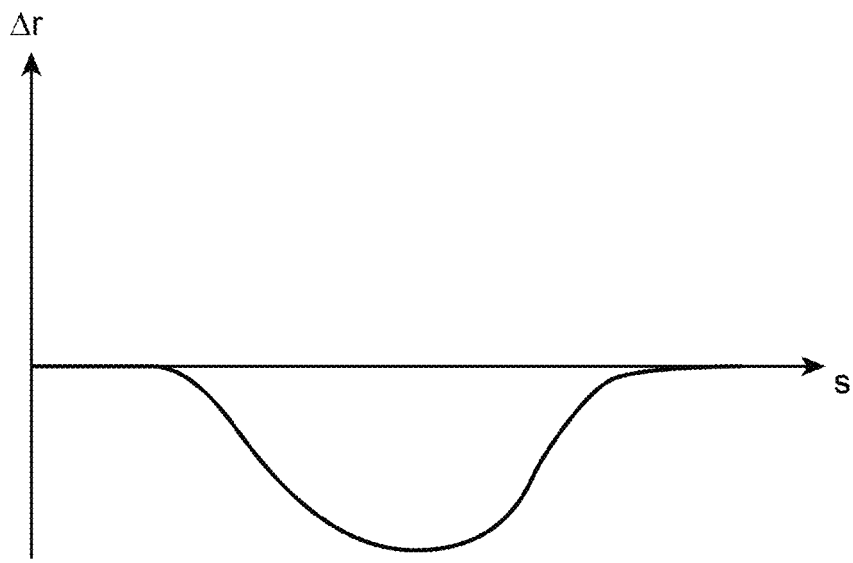
FIG. 14 is a graph of values of dents in the surface as a function of the curved abscissa value on the surface in the plane A-A of the upper part of FIG. 13, these dent values being estimated by the data processing device in the context of a step of the method.

Along each of the planes of section concerned, the data processing device 18 determines a corresponding dent profile by calculating the integral of the previously determined local gradients (for example making the assumption of no dent at the end of the integration domain). FIG. 14 illustrates the dent curve Δr thus obtained for the plane of section A-A defined in the upper part of FIG. 13.

Figure 15:
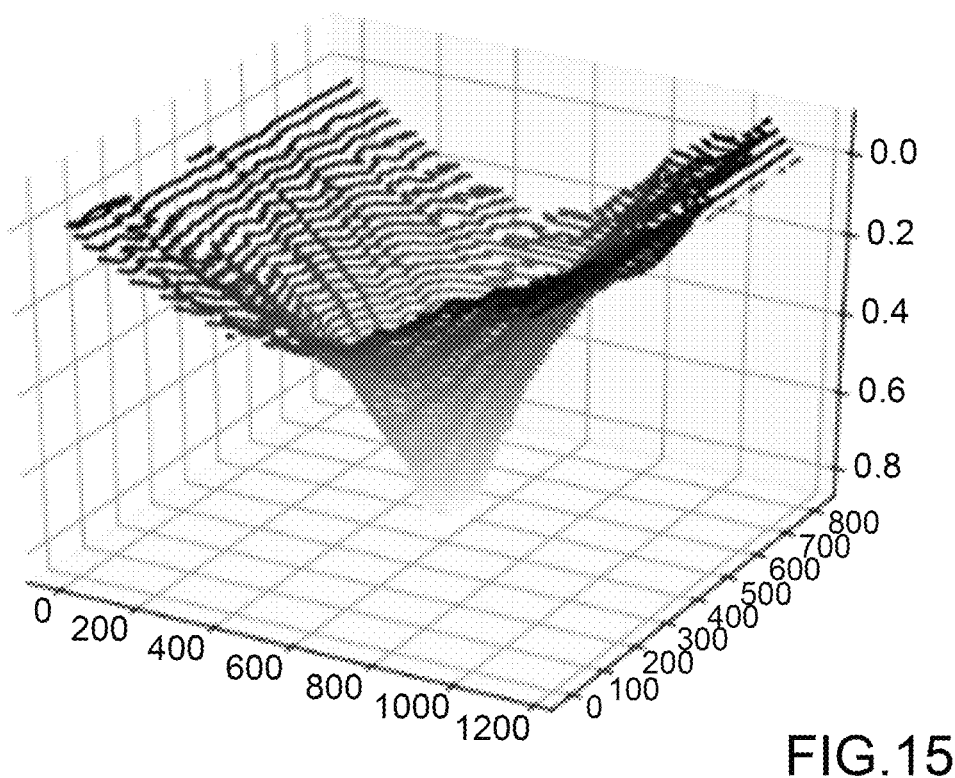
FIG. 15 is a three-dimensional graph illustrating a map of part of the surface reconstructed at the end of the method.

By juxtaposing all of the reconstructed dent profiles on adjacent planes of section, the data processing device 18 determines a map of the depth of the surface 30, or at least part thereof, as illustrated in FIG. 15.

For a given series of images, the number of planes of section considered in step C1-II is equal for example to the minimum longitudinal definition (in pixels) of the specular reflection ISR of the lighting device 16 in the images of the series.

The data processing device applies, for example, spatial filtering so as to reduce or eliminate measurement noise and low frequencies corresponding to large-sized deformations that do not correspond to the dents that are to be detected.

Finally, the data processing device 18 enumerates any dents 32 there might be in the surface 30 by likening any zone of the depth map, corresponding to a depth in excess of a predetermined threshold, to such a dent.

The dent detection method described hereinabove offers the notable advantage of being robust with regard to the movement blur caused by any parasitic vibrations of the flying drone 12, so that there is no requirement for the first image acquisition devices 14A, 14B to be gyrostabilized. This results in a certain advantage in terms of overall mass and moment of inertia of the drone, and therefore in terms of autonomy and maneuverability.

Furthermore, the step C2 generally consists in or comprises analyzing the other images acquired in step B2 so as to detect any superficial defects in the surface 30, such as scratches, fine cracks, runs, etc.

To this end, the processing device 18 advantageously employs an image combining algorithm so as to increase the signal-to-noise ratio (SNR) and a contrast detection algorithm, for example.

In general, at any stage in the method, a person skilled in the art will appreciate that it may be opportune to apply conventional noise reduction and signal optimization techniques.

A person skilled in the art will also appreciate that the order of certain steps may differ from that described hereinabove. For example, steps B1 and C1-I may be performed in parallel, the data processing device 18 implementing the data processing operations of step C1-I for a given plane of section of the surface 30 while a series of images for another plane of section of the surface is being acquired or, within the one same series of images, the data processing device 18 may implement the data processing operations of step C1-I for a given image while another image of the series is being acquired.

Because the flying drone 12 is equipped with two first image-acquisition devices 14A and 14B positioned at the opposite ends of the lighting device 16, each device perceives specular reflections of the lighting device 16 which are offset along the surface 30 that is to be inspected, which means that the part of the surface analyzed for a journey of the flying drone along a given plane of section is enhanced in comparison with what would be achieved with a single image acquisition device.

The trajectory followed by the flying drone in order to acquire one or more series of images may differ from that described hereinabove. In general, it is preferable for the trajectory (or where applicable the first portions of the trajectory) of the flying drone for acquiring a series of images (or each series of images) to be defined according to a plane of greatest curvature of the surface 30 while, where applicable, the second trajectory portions are defined along a plane of lesser curvature of the surface. Thus, in the example illustrated, the planes of section defining the first trajectory portions T1 and T3 are transverse to the surface 30 and are therefore planes in which the surface 30 has a curved (substantially circular) cross section, whereas the second trajectory portions T2 are defined parallel to the axis AX of the surface, in which direction the surface 30 has a zero curvature or smaller curvature.

A person skilled in the art will furthermore appreciate that the frequency of image capture may be adapted according to the desired spatial sampling of the surface 30 along a given plane of section, this sampling being dependent on the curvature of the surface and on the dimensions of the dents with which the surface 30 is likely to be afflicted.

Optionally, the method may comprise a step C1-I-b interposed between step C1-I and step C1-II, which involves an operator visually identifying one or more dents 32 in the surface 30 in the images acquired in step B1 and selecting one or more regions of the surface comprising the dent or dents, so that step C1-II implemented thereafter by the data processing device 18 concerns itself only with this region or these regions. The calculation time required for step C1-II can thus be reduced. Such a step C1-I-b may, alternatively, be carried out using an artificial intelligence previously trained to recognize specular reflection deformations characteristic of a dent in the surface.

Furthermore, sub-step c4 described hereinabove is implemented by taking advantage of the bijective nature of the 8(s) function connecting the orientation 8 of the local normal n to the surface 30 to the curvilinear abscissa value s on this surface along a given plane of section.

In a variant, sub-step c4 may rely on other methods for realigning the acquired images, on the surface 30, notably methods that do not require the surface 30 to be of a shape such that the aforementioned 8(s) function is a bijective function. To this end, sub-step c4 relies for example on the recognition, in at least some of the acquired images, of patterns existing on the surface 30. In the event that the surface 30 is the exterior surface of an aircraft, such patterns consist of or comprise, for example, rows of rivets. As a further variant, sub-step c4 may rely on the emission of a structured light by the lighting device 16 and the analysis of the reflection of structures formed by this light on the surface 30.

In general, the method according to the disclosure herein allows surfaces of very large dimensions, for example several hundred square meters, to be analyzed in a particularly quick, effective and reliable way, without requiring precise prior knowledge of the shape of these surfaces.

The method according to the disclosure herein allows all of the analysis steps C1-I, C1-II, C2, and, where applicable, C1-I-b, to be automated. When the ideal geometry of the surface 30 that is to be inspected is known, at least roughly, the control of the flying drone can be performed entirely or partially in a programmed manner, so that it is also possible for step B1 of the method to be automated.

The subject matter disclosed herein can be implemented in software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flying drone for inspecting a surface able to reflect light, the flying drone comprising:
   a chassis bearing one or more rotors;
   a lighting device formed of first and second light sources, each of which has a shape that is elongate in a longitudinal direction thereof; and
   an image acquisition assembly comprising:
      two first image acquisition devices; and
      a second image acquisition device positioned between the two first image acquisition devices;
   wherein the first light source is positioned between the second image acquisition device and one of the two first image acquisition devices;
   wherein the second light source is positioned between the second image acquisition device and another of the two first image acquisition devices;
   wherein the flying drone is configured to move past the surface along a trajectory, alternating phases of pseudo-hovering flight and transient phases during which a speed of travel of the flying drone is greater than a speed, if any, of the flying drone in the phases of pseudo-hovering flight, for carrying out steps of:
      during the transient phases, with the light sources illuminated, acquiring at least a series of images of portions of the surface by each of the first image acquisition devices so that, for each image in each series, the lighting device is illuminating a corresponding portion of the surface; and
      during the phases of pseudo-hovering flight, with the light sources switched off, acquiring other images of portions of the surface by the second image acquisition device, the other images having a resolution that is greater than a resolution of images of the series of images.

2. The flying drone according to claim 1, wherein, at least when the flying drone is in one particular state, the first and second light sources, the two first image acquisition devices, and the second image acquisition device are aligned along an axis of alignment corresponding to the longitudinal direction of each of the first and second light sources.

3. The flying drone according to claim 1, comprising two supports of elongate shape borne by the chassis and extending parallel to an axis of alignment, wherein the two first image acquisition devices are rigidly fixed to the two supports, respectively, and wherein the first and second light sources are rigidly fixed to the two supports, respectively.

4. The flying drone according to claim 1, comprising a first drive device configured to cause a rotation of each of the two first image acquisition devices and/or each of the first and second light sources about a first axis, the rotation being in an angular amplitude range at least equal to 30 degrees.

5. The flying drone according to claim 4, wherein the first axis is offset from the one or more rotors, so that the one or more rotors remain outside a field of view of each of the two first image acquisition devices, whatever an orientation of the two first image acquisition devices, in a range of at least 180 degrees about the first axis.

6. The flying drone according to claim 1, wherein the first and second light sources are configured to emit green light.

7. The flying drone according to claim 1, comprising a gyrostabilizer, by which the second image acquisition device is fixed to the chassis.

8. The flying drone according to claim 1, comprising a second drive device configured to cause a rotation of the second image acquisition device about a second axis, the rotation being in an angular amplitude range at least equal to 30 degrees.

9. The flying drone according to claim 8, wherein the second axis is offset from the one or more rotors, so that the one or more rotors of the flying drone remain outside a field of view of the second image acquisition device, whatever an orientation of the second image acquisition device, in a range of at least 180 degrees about the second axis.

10. A method for inspecting a surface able to reflect light, the method comprising at least steps of:
   A) providing a flying drone for inspecting the surface able to reflect light, the flying drone comprising:
      a chassis bearing one or more rotors;
      a lighting device formed of first and second light sources, each of which has a shape that is elongate in a longitudinal direction thereof; and
      an image acquisition assembly comprising:
         two first image acquisition devices; and
         a second image acquisition device positioned between the two first image acquisition devices;
      wherein the first light source is positioned between the second image acquisition device and one of the two first image acquisition devices; and
      wherein the second light source is positioned between the second image acquisition device and another of the two first image acquisition devices;
   B) moving the flying drone past the surface along a trajectory, alternating phases of pseudo-hovering flight and transient phases during which a speed of travel of the flying drone is greater than a speed, if any, of the flying drone in the phases of pseudo-hovering flight, to carry out substeps of:

- B1) during the transient phases, with the light sources illuminated, acquiring at least a series of images of portions of the surface by each of the first image acquisition devices so that, for each image in each series, the lighting device is illuminating a corresponding portion of the surface; and
- B2) during the phases of pseudo-hovering flight, with the light sources switched off, acquiring other images of portions of the surface by the second image acquisition device, the other images having a resolution that is greater than a resolution of images of the series of images acquired in substep B1.

11. The method according to claim 10, wherein, for each of the series of images that is acquired in substep B1, a trajectory of the flying drone is such that:

an optical axis of each of the first image acquisition devices remains in a corresponding plane of section of the surface; and the first and second light sources are each in an orientation such that the longitudinal direction thereof is secant with the plane of section of the surface.

12. The method according to claim 10, further comprising a step C comprising operating a data processor to analyze a shape of a specular reflection of the lighting device in all or part of the images of each of the series of images that is acquired in substep B1 to estimate a position of any dents in the surface.

13. The method according to claim 12, wherein step C comprises, for each series of images that is acquired in step B1, substeps of:

C1-I) for each image of the series of images, operating the data processor to perform sub-substeps of:

- c1) identify the specular reflection of the first and/or second lighting sources in the image;
- c2) from the specular reflection identified, estimate a median position, orthogonally to the longitudinal direction of the first and second light sources, of an ideal specular reflection of the lighting device in the image, corresponding to the median position of such a specular reflection in an absence of any dent in the surface;
- c3) determine a distance between the flying drone and the surface;
- c4) determine a position, on the surface, of each point of an origin of the specular reflection of the lighting device in the image; and
- c5) estimate a local gradient of the surface at each point of the origin of the specular reflection, at least from an estimate of any distance between each point of the specular reflection of the light source in the image and the estimated median position of the ideal specular reflection;

C1-II) from all of the estimated local gradients obtained as an outcome of step C1-I for at least one region of the surface, operating the data processor to estimate a position of any dents in the surface.

14. The method according to claim 10, comprising a step C2 of operating the data processor processing device to analyze the other images acquired in substep B2, to detect any superficial defects in the surface.

15. A system for inspecting a surface able to reflect light, the system comprising:

a flying drone according to claim 1; and a data processor configured to:

to analyze a shape of a specular reflection of the lighting device in all or part of the images of each series of images acquired during the transient phases to estimate a position of any dents in the surface; or to analyze images acquired during the phases of pseudo-hovering flight to detect any superficial defects in the surface.

* * * * *